United States Patent
Adler et al.

(10) Patent No.: US 10,685,129 B2
(45) Date of Patent: Jun. 16, 2020

(54) DATA PROCESSING SYSTEM

(71) Applicants: Michael Adler, Nürnberg (DE); Klaus-Peter Hofmann, Aurachtal-Münchaurach (DE)

(72) Inventors: Michael Adler, Nürnberg (DE); Klaus-Peter Hofmann, Aurachtal-Münchaurach (DE)

(73) Assignee: Siemens Aktiengesellschaft, München (DE)

( * ) Notice: Subject to any disclaimer, the term of this patent is extended or adjusted under 35 U.S.C. 154(b) by 218 days.

(21) Appl. No.: 15/689,794

(22) Filed: Aug. 29, 2017

(65) Prior Publication Data

US 2018/0060594 A1   Mar. 1, 2018

(30) Foreign Application Priority Data

Aug. 30, 2016   (EP) .................................... 16186222

(51) Int. Cl.
| | | |
|---|---|---|
| *G06F 21/60* | (2013.01) | |
| *H04L 29/06* | (2006.01) | |
| *G06F 21/64* | (2013.01) | |
| *H04L 29/08* | (2006.01) | |

(52) U.S. Cl.
CPC ............ *G06F 21/606* (2013.01); *G06F 21/64* (2013.01); *H04L 63/10* (2013.01); *H04L 63/1408* (2013.01); *H04L 67/327* (2013.01)

(58) Field of Classification Search
CPC ..................................................... G06F 21/606
See application file for complete search history.

(56) References Cited

U.S. PATENT DOCUMENTS

| | | | |
|---|---|---|---|
| 2010/0188975 A1* | 7/2010 | Raleigh ............ | G06Q 10/06375 370/230.1 |
| 2014/0282821 A1* | 9/2014 | Adler ...................... | H04L 63/10 726/1 |
| 2015/0261810 A1 | 9/2015 | Kim et al. | |
| 2017/0214701 A1* | 7/2017 | Hasan ................. | H04L 63/1408 |

FOREIGN PATENT DOCUMENTS

| | | |
|---|---|---|
| CN | 103580871 A | 2/2014 |
| EP | 2827547 A1 | 1/2015 |
| WO | WO2015000967 A1 | 1/2015 |
| WO | WO2015153373 A1 | 10/2015 |

OTHER PUBLICATIONS

European Search Report for European Application No. 16186222.2-1870, dated Dec. 9, 2016.
Chinese Office Action for Chinese Application No. 201710657737.4 dated Feb. 3, 2020, with English translation.
European Communication under Rule 71(3) EPC for European Application No. 16186222.2-1218 dated Jan. 30, 2020.

* cited by examiner

*Primary Examiner* — Simon P Kanaan
(74) *Attorney, Agent, or Firm* — Lempia Summerfield Katz LLC

(57) ABSTRACT

A data processing system is provided with a data verification system that is configured to perform a validation check upon receipt of a request from a field device to transfer data to the data processing system. The data verification system is also configured to verify a permission of the field device to exchange data and to validate the data integrity. A data landing zone is provided for temporary storage of the data in the event that a validation check fails, so that data errors may be corrected.

10 Claims, 2 Drawing Sheets

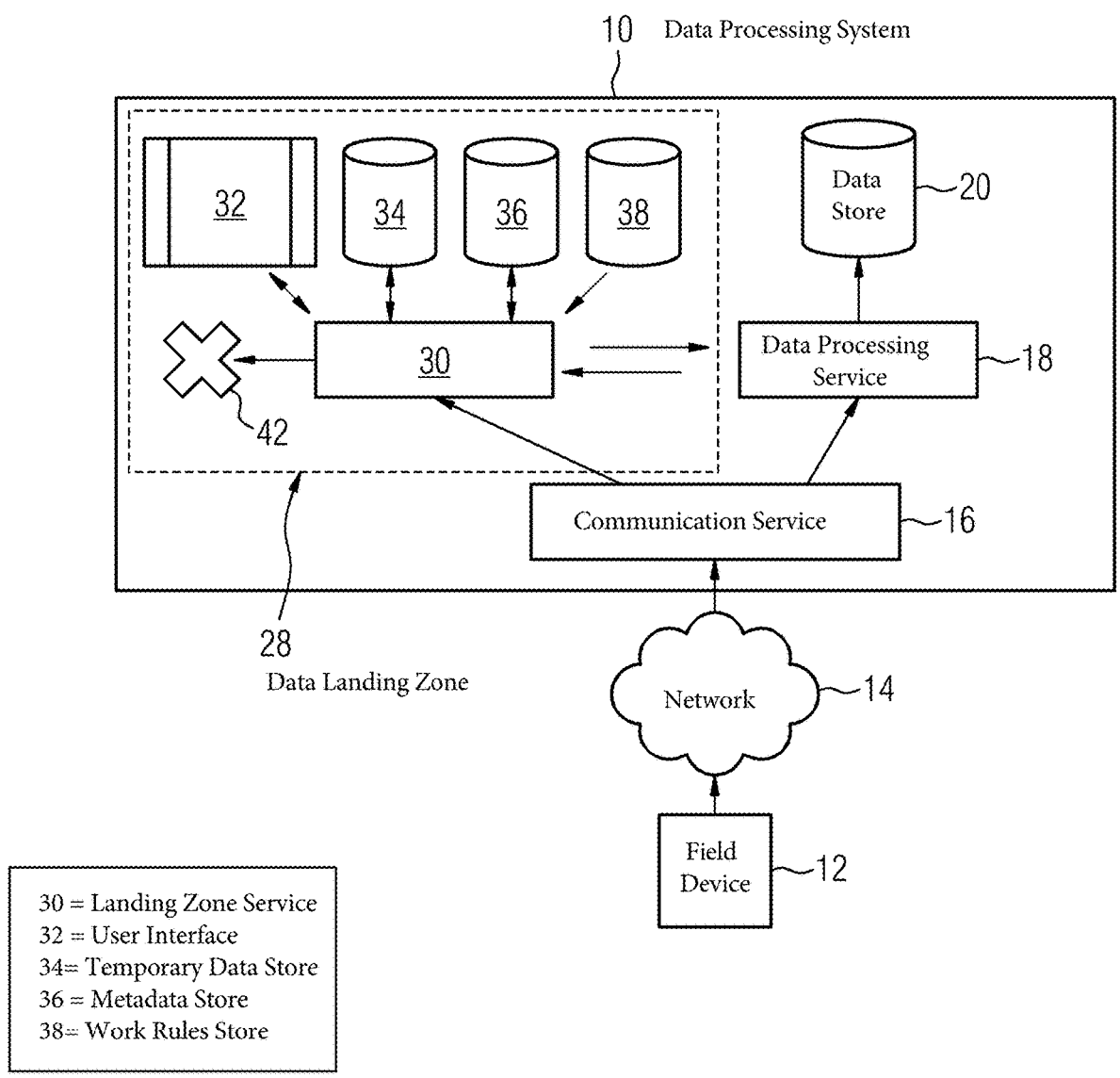

DATA PROCESSING SYSTEM

This application claims the benefit of EP 16186222.2, filed on Aug. 30, 2016, which is hereby incorporated by reference in its entirety.

BACKGROUND

The present embodiments relate to a data processing system.

The "Internet of Things" (IoT) is a name for a known trend in information technology that refers to various technologies and methods for devices to exchange data via the Internet and other computer networks. Devices that exchange data may be provided with embedded electronic circuitry, software, sensors, actuators, and communication devices providing network connectivity.

A typical IoT system includes a data processing system that is arranged to receive and process data from a plurality of field devices. The data processing system may include a data center and may be implemented as a cloud-based platform.

When a field device requests to connect to the processing system, the data processing system is to decide whether to accept the connection, and whether to accept the data from the field device. For security reasons, but also to control costs and resource consumption, rules to deny certain devices to send data if that is not explicitly wanted are established.

In terms of security, the data processing system is to know certain aspects of the devices that send data (e.g., whether the device that sends data is allowed to do so, whether the device is registered to a known tenant, whether the data that is sent is understandable to the data processing system for processing (by having a known data structure), whether the data may be interpreted (whether the data semantics are known), whether the data is actually wanted to be stored, etc.).

There are some problems in relation to the processing of unknown devices, unknown data, or unknown data structures.

The normal approach is based on a simple authorization challenge, implementing a "yes or no" concept, whereby a field device is simply either permitted or denied to exchange data with the data processing system. This authorization decision is typically based on exchange of a secret such as a certificate, where the field device presents a secret to the data processing system that was formerly generated at the data processing system. When this is the case and the device gains access and may send data, the data is accepted. However, in some cases, a device is not known, and yet it still may be desired to process the data of the device. In that case, the data is lost because the normal simple authorization challenge rejects the attempt immediately.

If a field device connection is accepted, there are still problems if data of the field device cannot be processed or stored (e.g., because the structure or semantics are unknown). Typically, errors are generated, and the data is lost. This lacks a finer grained problem solving mechanism, and the option to correct the problems before data is deleted.

In addition, this solution imposes a cost risk. If all the data is accepted and stored by the platform, this will cause operational cost (e.g., additional storage resources required in a storage database that may be billed by units of gigabytes or similar).

SUMMARY AND DESCRIPTION

The scope of the present invention is defined solely by the appended claims and is not affected to any degree by the statements within this summary.

In environments such as legal environments where a customer is to be aware of which costs the customer is to expect (e.g., within a month), there is a need for a solution that allows customers in advance to accept or deny the data that is sent by field devices. This is in contrast to classic pay-per-use models where the customer accepts that the customer simply has to pay the resources the customer consumed. In industrial IoT, the matter is a bit different because the field devices may not be in full control of the customer (e.g., when serviced by third party companies).

The present embodiments may obviate one or more of the drawbacks or limitations in the related art. For example, a method and a system to address or ameliorate the problems discussed above and other problems are provided.

According to a first aspect, a data processing system includes a data verification system that is configured to perform a validation check upon receipt of a request from a field device to transfer data to the data processing system. The data processing system also includes a data store and a data landing zone. The data verification system is further configured to pass the data associated with the request to the data store if the validation check is successful and to pass data related to the request to the data landing zone if the validation check is unsuccessful.

In one embodiment, the validation check includes verifying whether the field device making the request is permitted to send data.

If the field device is not permitted to send data, the validation check fails and the data is sent to the data landing zone.

In one embodiment, the validation check includes checking the integrity of the data associated with the request.

If the data fails the integrity check, the validation check fails and the data is sent to the data landing zone.

In one embodiment, the data verification system is configured to check the integrity of the data associated with the request only after a field device is verified as being permitted to send data.

In one embodiment, the data landing zone includes a data cleaning service configured to modify the data so that the data may pass the validation check of the data verification system.

In one embodiment, the data landing zone is configured to pass data back to the data verification system once the data is processed by the data cleaning service.

In one embodiment, the data cleaning service includes work rules that may be applied to the data.

In one embodiment, the data landing zone includes a user interface for modifying the data or the work rules.

In one embodiment, data stored in the data landing zone is purged after expiry of a predetermined time period.

According to a second aspect, a method of processing data includes receiving a request from a field device to exchange data with a data processing system. A validation check is performed on receipt of the request. Data associated with the request is passed to a data store if the validation check is successful, data related to the request is passed to a data landing zone if the validation check is unsuccessful.

Further aspects, features and advantages of the present invention will become apparent from the drawings and detailed description of the following embodiments.

BRIEF DESCRIPTION OF THE DRAWINGS

The shown embodiments are intended to illustrate but not limit the invention. The drawings contain the following figures, in which like numbers refer to like parts throughout the description and drawings.

FIG. 3 shows an example of an IoT data processing system according to an embodiment.

DETAILED DESCRIPTION

A system providing a fine granular mechanism to support platform operators and administrative users in managing unknown devices or unpredicted use cases or scenarios and solving problems in this area in a managed way is provided.

Figure 1:
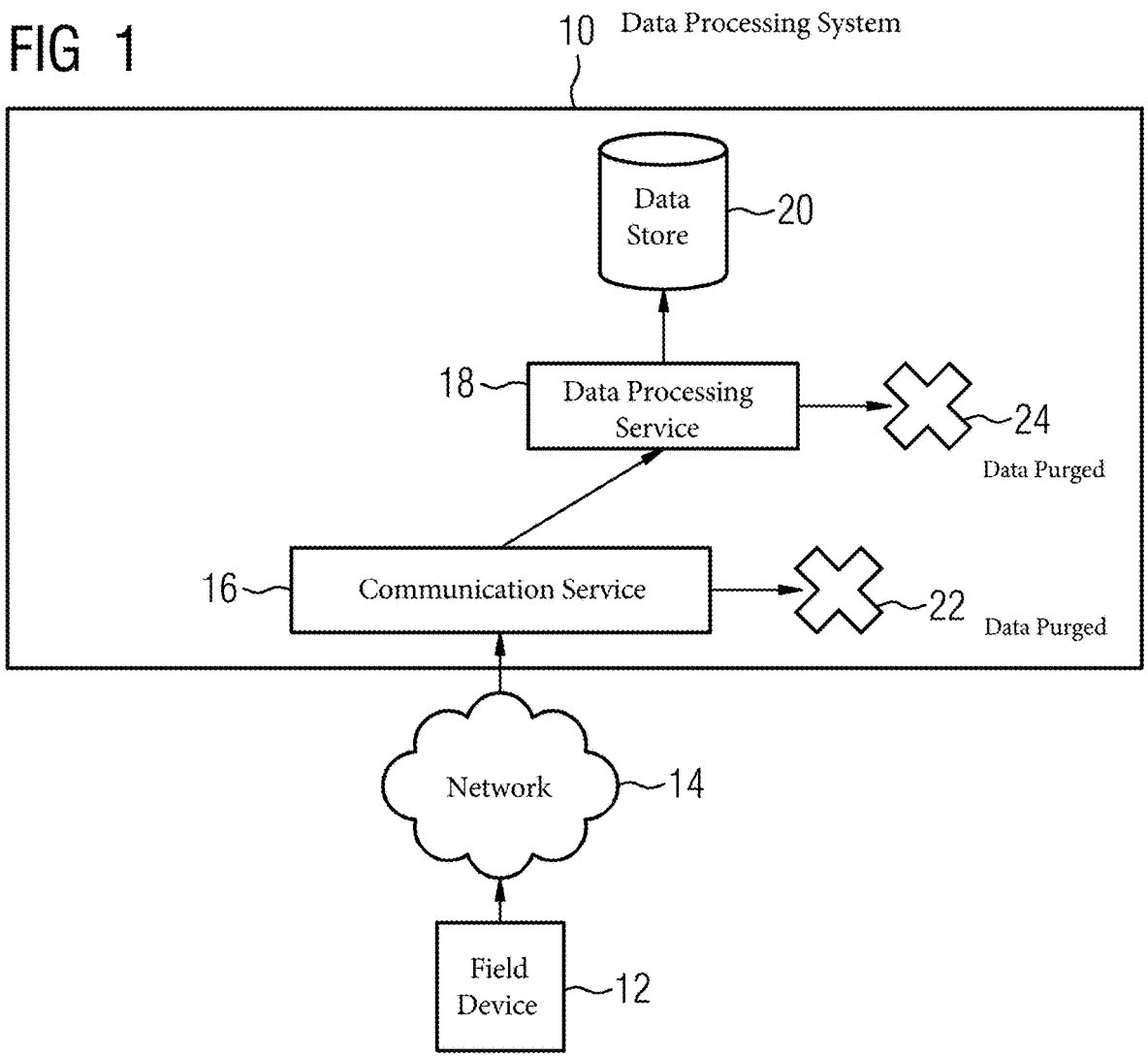
FIG. 1 shows a known Internet of Things (IoT) data processing system.

FIG. 1 shows a known Internet of Things (IoT) system. A data processing system 10 is arranged to receive data from a field device 12 via a network 14 such as the Internet. The data processing system 10 includes various components and capabilities for receiving, processing, and sending data. The data processing system 10 may be implemented as a cloud-based data services platform.

The data processing system 10 provides a field device communication service 16 that accepts or rejects the connection from the field device 12. This service terminates the data transmission and is able to accept/interpret data sent using protocols such as HTTP, HTTPS, MQTT, CoAP, and extracts the actual data from the transported packages. The data is then provided to a data processing service 18 that is able to interpret the data (e.g., knows structure) and tries to write the data to a data store 20 that may provide a persistent database or other structure for storing the data in memory.

Services may be implemented as modules that have appropriate hardware and software for carrying out the required functionality.

While only one field device 12 is illustrated, many such devices may be provided in an IoT system.

In this system, there are various issues to be solved. The communication service 16 will only accept data from field devices 12 authorized to send data in an earlier stage. There may be a rule in place that defines if a field device 12 is known and authorized or not. If the field device 12 is not authorized, typically the data is purged (illustrated at 22), and an error log is written to indicate the problem to administrative users and operators.

Also, if the data may not be interpreted by the data processing service 18, either because the data has an unknown structure or the semantics are unclear, it is difficult to store the data permanently. As a result, in most cases, the data is purged (illustrated at 24), and an error log may be written to indicate the problem to administrative users and operators.

Figure 2:
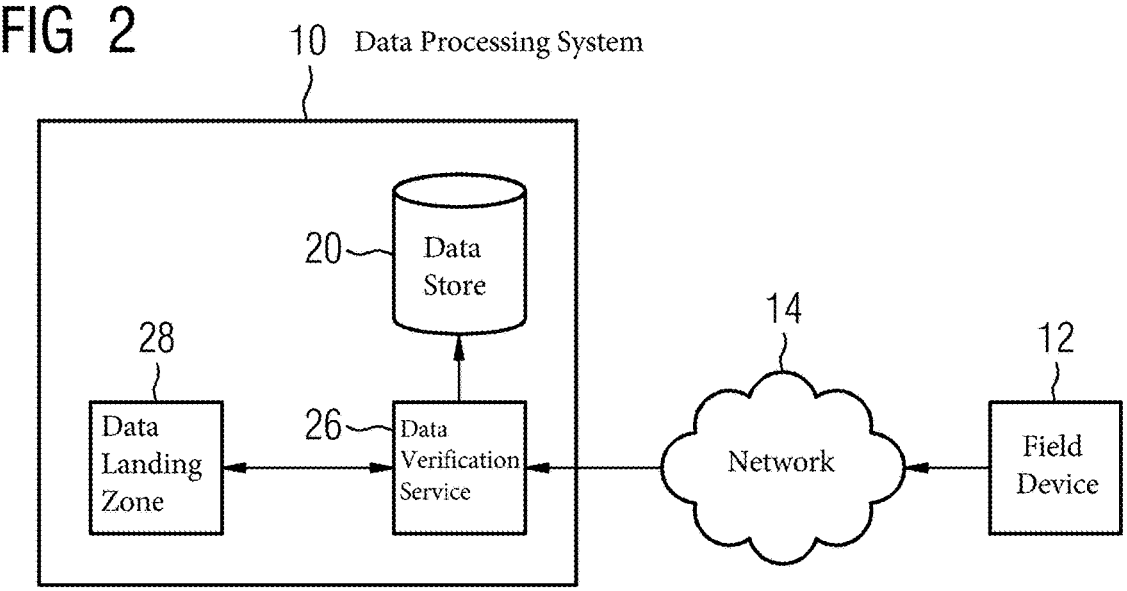
FIG. 2 shows one embodiment of a data processing system.

FIG. 2 illustrates an improved data processing system 10 according to an embodiment. The data processing system 10 receives data from a field device 12 via a network 14 such as the Internet. A data verification service 26 carries out checks before storing the data in a data store 20. As described above, the data verification service 26 may include modules that have appropriate hardware and software for carrying out the required functionality, and may alternatively be referred to as a data verification system. This data store 20 may be for storing data persistently, and data that meets one or more criteria that are checked by the data verification service 26 may only be stored. If the data verification service 26 finds that the data does not meet these criteria, the data is not stored in the data store 20 but is instead passed to a data landing zone 28.

The data landing zone 28 may simply store the relevant data for future reference. In one embodiment, the data landing zone 28 may provide a data cleaning service or component that may modify the data so that the data may pass the checks carried out by the data verification service 26. Once the data has been modified, the data may be passed back from the landing zone 28 to the data verification service 26, which then validates the data and passes the data to the data store 20.

The data cleaning service may include a way (e.g., a device) for automatic or manual (e.g., human user) modification of data to comply with the relevant criteria.

FIG. 3 shows details of a further embodiment of a data processing system 10. A data verification service 26 includes a field device communication service 16 and a data processing service 18. The field device communication service 16 and the data processing service carry out checks in a similar fashion to that described above with reference to FIG. 1 (e.g., the field device communication service 16 checks whether a field device 12 is permitted to send data). This may be by verifying if the field device 12 is known or not, by comparing a device identifier with a list of known devices. Alternatively, a field device 12 may be permitted to send data based on other criteria (e.g., the field device 12 itself as identified by a MAC address or other unique identifier may not be known, but the system may be set up to permit a certain class of field device 12 to transmit data, the class defining devices that are of a given type or made by a given manufacturer). If the request from a field device 12 fails this test, the data will not be sent onwards for regular processing but is instead passed to the data landing zone 28. If the request passes this test, the request is passed to the data processing service 18.

The data processing service 18 then checks the data integrity. If the data fails the data integrity test, then the data is not passed on to be stored in the data store 20 but is instead passed to the data landing zone 28. Checking data integrity may, for example, include verifying that the data complies with any one or more of required data format, structure, or semantics.

The data landing zone 28 in this embodiment includes a landing zone service 30, a landing zone user interface 32, a temporary data store 34, a metadata store 36, and a work rules store 38. In one embodiment, data in the data landing zone 28 may be purged (shown at 42).

The data landing zone 28 provides a way for administrative users (e.g., either platform operators or end-customer administrators) to have a chance to react to the incoming unknown, unauthorized, or undefined data in a way that this data is not lost.

The landing zone service 30 is able to accept data from unknown devices and/or problematic data. So the field device communication service 16 and/or the data processing service 18 are able to provide the problematic data and associated metadata (e.g., actual source device information, transport layer information, data processing problem information, etc.) to the data landing zone 28 (illustrated by the arrows originating at the field device communication service 16 and the data processing service 18 and pointing to the landing zone service 30). The data landing zone 28 includes a business logic that is supported by a rule set (e.g., work rules store 38) that defines how to deal with the different problem scenarios. A flexible system that is able to adapt to different problem scenarios is built and is not limited to the presented scenarios above.

The temporary data store 34 allows data from the problematic devices to be stored for a certain amount of time. The data is not interpreted but only stored in the form the data is received. The temporary data store 34 is used by and controlled by the landing zone service 30. Based on the work rules, the landing zone service 30 may keep the unprocessed data for a while. If the problems around this data are not solved in a configured time, the data may be purged as well (as shown at 42).

The meta data store 36 keeps all information around the actual problem case. This may include but is not limited to: source device information, transport layer information, data processing problem information, time information, problem case status, problem case history, and other information. The meta data store 36 may be used by and controlled by the landing zone service 30. Every new problem case is managed by the landing zone service 30, and a new set of metadata is created. Based on the work rules, the landing zone service 30 may keep the metadata for a while. If the problems around this data are not solved in a configured time, the metadata may be purged (not shown).

The work rules store 38 keeps the actual rules to control the behavior of the landing zone service 30. This includes, for example, the maximum problem solving time before data is purged 42. This may be extended in a way that new rules may be introduced to handle new problem case types.

A user interface 32 may be provided to allow human users to solve the problem cases. Each problem case type may use a different workflow for problem resolving. The user interface component 32 may thus be extensible in a way that new workflows may be added for each problem type.

As an example, if an unknown or unauthorized field device 12 tries to send data to the data processing system 10, the problem resolving may require a manual process of device onboarding or device authorization. This will use interfaces from the user interface component to the platforms authorization and device management infrastructure (not shown in the figure).

In another case (e.g., when the data processing service cannot interpret the data because of missing data structure information), the user interface may use a work flow for defining the data model or semantics for this data. This uses interfaces from the user interface component 32 to the data modeling infrastructure (not shown on the figure) of the data processing system or the cloud platform. The user interface 32 may thus provide a management tool for the different workflows to manage and resolve problem cases.

The present disclosure provides various advantages. An end user or platform operations administrator has a chance to correct problems with incoming devices 12 and data without losing the data. This gains much higher transparency for problematic devices 12 and data. Data that is collected in the field and is not yet configured (e.g., data model) in the cloud is not lost immediately but may be recovered when the data model is configured within a given time span (illustrated by the arrow originating at the landing zone service 30 and pointing to the data processing service 18). This is also an effective protection against malicious data. An end user also has better control over which data is stored and which data is not stored.

Another positive side effect of this solution relates to the control of costs. Assuming that an end user has to pay platform usage based on the amount of stored data, the end user may need to be informed about the projected cost before data is inserted into the platform. In order to achieve this, the system of the present embodiments may implement a rule to place data into the data landing zone 28 until the end user is informed about the projected cost and the accepts the projected costs. The data is then transferred (e.g., by the landing zone service 30 and the data processing service 18) to the data store 20. This enables a cost-control feature.

The invention may be applied not just to IoT applications but to other data processing systems where a central data store receives data from various devices.

In addition to the embodiments described above, those of skill in the art will be able to arrive at a variety of other arrangements and steps that, if not explicitly described in this document, nevertheless embody the principles of the invention and fall within the scope of the appended claims.

The logic code, programs, modules, processes, methods, and the order in which the respective elements of each method are performed are purely exemplary. Depending on the implementation, the respective elements may be performed in any order or in parallel, unless indicated otherwise in the present disclosure. Further, the logic code is not related or limited to any particular programming language, and may include one or more modules that execute on one or more processors in a distributed, non-distributed, or multiprocessing environment.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A data processing system comprising:
   a data verification system that is configured to perform a validation check upon receipt of a request from a field device to transfer data to the data processing system, wherein the validation check comprises verification of whether the field device making the request is permitted to send data and a check of integrity of the data associated with the request, and wherein the data verification system is further configured to check the integrity of the data associated with the request only after the field device is verified as being permitted to send data;
   a data store; and
   a data landing zone comprising a data cleaning service configured to modify the data so that the validation check by the data verification system is passable, wherein the data verification system is further configured to:
      pass the data associated with the request to the data store when the validation check is successful; and
      pass data related to the request to the data landing zone when the validation check is unsuccessful.

2. The data processing system of claim 1, wherein the data landing zone is configured to pass data back to the data verification system once the data is processed by the data cleaning service.

3. The data processing system of claim 1, wherein the data cleaning service comprises work rules that are applicable to the data.

4. The data processing system of claim 3, wherein the data landing zone comprises a user interface configured to modify the data or the work rules.

5. The data processing system of claim 1, wherein data stored in the data landing zone is purged after expiry of a predetermined time period.

6. A method of processing data, the method comprising:
receiving a request from a field device to exchange data with a data processing system;
performing a validation check on receipt of the request, the validation check comprising verifying whether the field device making the request is permitted to send data and checking integrity of the data associated with the request, the checking of the integrity occurring only after the field device is verified as being permitted to send data; and
passing data associated with the request to a data store when the validation check is successful and passing data related to the request to a data landing zone when the validation check is unsuccessful,
wherein the data landing zone comprises a data cleaning service operable to modify the data so that the validation check by the data verification system is passable.

7. The method of claim 6, further comprising passing data, by the data landing zone, back to the data verification system once the data is processed by the data cleaning service.

8. The method of claim 6, wherein the data cleaning service comprises work rules that are applicable to the data.

9. The method of claim 8, wherein the data landing zone comprises a user interface configured to modify the data or the work rules.

10. The method of claim 6, further comprising purging data stored in the data landing zone after expiry of a predetermined time period.

* * * * *